Patented June 12, 1951

2,556,376

UNITED STATES PATENT OFFICE 2,556,376

RECOVERY OF POLYMYXIN FROM FERMENTATION BROTHS

Peter P. Regna, Woodcliff, N. J., and Isaiah A. Solomons, III, Garden City, N. Y., assignors to Chas. Pfizer & Co., Inc., New York, N. Y., a corporation of New Jersey No Drawing. Application September 9, 1948, Serial No. 48,531

6 Claims. (Cl. 167—65)

This invention relates to the art of recovering and purifying therapeutically useful antibiotic substances, and it has for its object to provide a novel and improved process for accomplishing this purpose. This application is a continuation in part of our application Serial No. 764,246, filed July 28, 1947.

Another object of the invention is to provide a method for separating salts of alkaline-reacting nitrogen basic antibiotic substances of high potency from complex mixtures containing the same.

Another object is to provide certain novel individual steps in the recovery of these biologically active basic substances and some novel combinations of these steps as will become evident as the invention is described.

A further object of the invention is to provide an efficient and economical method of precipitating water-soluble basic antibiotic substances of the group known as polymyxins from aqueous solutions such as fermentation broths and recovering both the antibiotics and the precipitating agents in practicably high yields.

A specific object is the recovery of antibiotics of the above type from mixtures such as fermentation broths by precipitation with a soluble salt of 1-(4-chloro-o-sulfophenyl)-5-hydroxy-3-methyl-4-[p-(p-tolylsulfonoxy)-phenylazo]-pyrazole, a dye which is also known in the trade as Polar Yellow 5G and as Milling Yellow 5G (a certified color identified as Certified color D & C Yellow, No. 4 by the U. S. Department of Agriculture, Food and Drug Administration).

In addition to the precipitation of these alkaline-reacting nitrogen basic antibiotics from fermentation broths with Polar Yellow 5G, this invention also provides a novel means of liberating these antibiotics and similarly constituted antibiotic substances from their insoluble Polar Yellow salts.

While this invention is broadly applicable to a number of nitrogen basic antibiotic substances, as will become evident as the procedures are disclosed, the features of this invention will be particularly described with reference to polymyxin as a typical alkaline-reacting nitrogen basic antibiotic substance.

Polymyxins are antibiotics produced by an aerobic spore-bearing bacillus, identified as *Bacillus polymyxa*, also known to bacteriologists as *Bacillus aerosporus* (G. Brownlee and S. R. M. Bushby, Lancet, (1948), I, p. 127; P. N. Swift, ibid., (1948), I, p. 133; P. G. Stansly, R. G. Shepherd and H. J. White, Bull. Johns Hopkins Hosp., vol. 81, p. 43, (1947). These antibiotic substances are produced in broth containing sucrose or glucose with traces of manganese. The organism grows in shallow layers at 28° C. at the bottom of the culture fluid and forms at the same time a considerable amount of mucilage (Nature vol. 160, 263 (1947)), which hinders application of the known methods of recovery of the active substances.

There are a number of polymyxins formed in varying proportions by different strains of *B. polymyxa*. While all are composed of condensation polymers of amino acids, they differ somewhat in their amino acid contents and in their specific physiological manifestations. These antibiotics have been shown to be polypeptides containing a primary amine with no acidic groups. Studies of the acid hydrolysates of the polymyxins have shown the presence of a fatty acid and, in addition, the presence of D-leucine, L-threonine, D-serine and L-$\alpha,\gamma$-diaminobutyric acid in polymyxin P; the presence of D-leucine, L-threonine and the L-$\alpha,\gamma$-diaminobutyric acid in polymyxin A; the presence of D-leucine, L-threonine, L-phenylalanine and L-$\alpha,\gamma$-diaminobutyric acid in polymyxin B; and the presence of L-phenylalanine, L-threonine and the L-$\alpha,\gamma$-diaminobutyric acid in polymyxin C (Conference on Antibiotics Derived from Bacillus Polymyxin, May 21 and 22, 1948, The New York Academy of Sciences, New York city; and T. S. G. Jones, Biochem. J., vol. 42, No. 2, p. XXXV (1948). For purposes of this application, we shall refer to these nitrogen basic polypeptide antibiotics as "polymyxins".

The polymyxins are effective in inhibiting the growth of the coli-typhoid-dysentery organisms and other organisms of the haemophilus group. This group of antibiotics was found to be highly effective when administered subcutaneously to mice infected with *Klebsiella pneumoniae* or *Pasteurella multocida*.

It has been reported that polymyxin-type antibiotics can be recovered by adsorption on activated carbon and elution with acidified methanol. The active principle is then precipitated by adding 5 to 10 volumes of acetone to the eluate. The crude material can be partly perified by conversion to the helianthate and then to the hydrochloride which is amorphous and hygroscopic, or the material can be purified through the water-insoluble picrate. However, the acid salts of polymyxin recovered by these methods are crude concentrates having low biological activity and containing organic and inorganic impurities. Consequently these crude preparations are not satisfactory in the treatment of infections, since appreciable amounts of these impure concentrates must be administered to obtain therapeutic levels of the antibiotic. Thus there is always the attendant risk that the impurities may produce unfavorable physiological reactions.

We have now discovered that members of the polymyxin group and other alkaline-reacting nitrogen basic antibiotic substances are precipitated substantially quantitatively from fermentation broths with a specific precipitant which combines with the antibiotic substance in the growth medium to form an insoluble antibiotic salt of 1-(4 - chloro - o - sulfophenyl) - 5 - hydroxy - 3 - methyl - 4 - [p - (p - tolylsulfonoxy) - phenylazo]-pyrazole.

Acid salts of polymyxin liberated from the corresponding dye salts have a purity of over 80%. In certain of these polymyxins this high purity material is essentially free of nephrotoxic substances and is relatively non-toxic on injection into the blood stream. Moreover, according to this invention, our novel purification process eliminates other objectionable toxic impurities present in cruder fractions of certain polymyxins, such as those which produce a histamine-like depression in the blood pressure. Thus, this process provides therapeutically valuable antibiotics.

According to the present invention, a freshly harvested polymyxin fermentation broth is acidified and heated so that the mucilage thins out and the cells coalesce. Although the broth can be treated with the yellow dye within pH 2 to 9, for best results we prefer to carry out the precipitation at pH 3.5. Thus after adjusting the pH to a suitable value, the filtered solution is reacted with an aqueous solution of sodium 1-(4 - chloro - o - sulfophenyl) - 5 - hydroxy - 3 - methyl - 4 - [p - (p - tolylsulfonoxy) - phenylazo] - pyrazole, hereinafter called Polar Yellow to form polymyxin 1-(4-chloro-o-sulfophenyl)-5 - hydroxy - 3 - methyl - 4 - [p - (p - tolylsulfonoxy)-phenylazo]-pyrazole, an insoluble and amorphous or crystalline precipitate which is soluble to the extent of less than .005 mg./ml. This Polar Yellow salt can be prepared even from broth containing less than .02 mg./ml. of polymyxin.

The salt is readily isolated by filtration and after washing it with water it is dried preferably in vacuo. The polymyxin can be liberated from the dried Polar Yellow salt by suspending it in a mixture of acetone and methanol. After stirring, the mixture is treated with an amine salt, for instance, with an alcoholic solution of triethylamine sulfate, which reacts with the polymyxin Polar Yellow, precipitating the polymyxin sulfate and keeping the triethylamine Polar Yellow salt in solution. The polymyxin Polar Yellow salt can be converted to acid salts of polymyxin in a solvent medium or mixture of solvents in which the corresponding amine salt is freely soluble and the acid salt of polymyxin has a low solubility. The solubility of the polymyxin salt can be diminished by adding a second miscible solvent in which the polymyxin acid salt is only very slightly soluble. It has been found that one of the more convenient solvent mixtures is acetone-methanol in the ratio of 3.5:1.5, but many combinations of solvents are possible.

It is further understood that no limitation is put on the polymyxin acid salt obtained as an insoluble salt from solvents and mixtures of solvents described above. The solvent-insoluble sulfate salt can, for example, be converted to the hydrochloride by dissolving in water and keeping in contact with an anion exchange resin which removes the sulfate ions and adjusting to the proper pH with hydrochloric acid. The polymyxin sulfate can also be dissolved in water and after removing the sulfates with barium hydroxide, the basic antibiotic can be acidified with any other acid such as citric acid, acetic, phosphoric, tartaric, etc. to obtain the corresponding polymyxin acid salt.

In the foregoing procedure, various amine salts can be used to precipitate polymyxin, such as the phosphates, tartrates, citrates, etc. For example, any soluble amine sulfate may be employed in the precipitation; conditions being that both the amine sulfate, and the amine salt of the dye, are soluble in alcohol, acetone or mixtures of the aforementioned solvents. These conditions are realized by a number of amines, such as, for example, dimethylaniline, diethylaniline, ethylamine, triethylamine, quinoline, pyridine, ethanolamine, etc. In addition to the amine sulfates, the polymyxin can be precipitated from solutions of polymyxin Polar Yellow by other amine salts, such as amine phosphates, sulfonates, oxalates, citrates, or other organic and inorganic acids which produce alcohol-insoluble polymyxin salts and soluble amine Polar Yellow salts.

In addition to thus providing a method for isolating polymyxin from crude fermentation broths containing miscellaneous and extraneous substances, this procedure is capable of furnishing a relatively pure therapeutic agent by reprecipitating it with Polar Yellow and again liberating the polymyxin from the insoluble polymyxin dye salt. Thus, the polymyxin Polar Yellow salt is a very useful agent for selecting the polymyxin from crude fractions and enriching the activity of the final salt.

This invention embraces various modifications and features of expediency and flexibility. For instance, the crude polymyxin may be first isolated from the broth by ion-exchange materials reserving the Polar Yellow purification for the succeeding step. Superior results were obtained when a broth was adsorbed on sodium cotton succinate. After eluting the polymyxin from the ion-exchange with dilute sulfuric acid, the latter was neutralized with sodium hydroxide and the polymyxin was precipitated with the sodium salt of Polar Yellow 5G. After liberating the polymyxin from the dye salt and recovering the polymyxin as the sulfate, it was found to possess a biological activity of about 7000 U./mg.

Alternatively, the Polar Yellow precipitation may be used first to isolate the polymyxin from the original fermentation broth and subsequently to purify it by still another procedure. After collecting, washing, and liberating polymyxin from the antibiotic dye salt the polymyxin may be collected as its insoluble base by precipitation with alkali or amines. After washing the amorphous precipitate thoroughly with water to remove all traces of alkali, the polymyxin is suspended in water and neutralized to the desired pH with a variety of mineral or organic acids to form the corresponding polymyxin acid salts.

Our invention is broadly applicable; this procedure can also be used for detecting the sparingly soluble salts of polymyxin in variously composed mediums. Furthermore, this invention can be used in the detection, isolation and purification of a number of water-soluble antibiotic substances of microbial origin having the characteristics of a base such as streptothricin, bacitracin, streptomycin, etc. In the case of streptomycin (A. Schatz, E. Bugie and S. A. Waksman, Proc. Soc. Exptl. Biol. Med., vol. 55, p. 66 (1944) and streptothricin (S. A. Waksman and H. B. Woodruff, Proc. Soc. Exptl. Biol. Med., vol. 49, p. 207 (1942), it has been shown that these basic antibiotics can be isolated from culture media by adsorption on activated carbon and elution with acidified methanol. However, this method provides materials of low biological activity which are unsatisfactory for therapeutic administration. Extraneous substances are eliminated from crude streptomycin or streptothricin solutions, for example, when the antibiotics are reacted with the sodium salt of Polar Yellow. Upon liberating the basic active substances from the dye salts, correspondingly pure streptomycin and streptothricin mineral acid salts are obtained.

The foregoing procedures are described in more detail in the following examples, but these are given by way of illustration and not for purpose of limitation.

*Example 1*

To 5 l. of a freshly harvested fermentation broth (1000 U./ml.), containing the elaboration products formed by a culture of *Bacillus polymyxa* which produces chiefly polymyxin A, was added concentrated hydrochloric acid to pH 1.6. The mixture was heated at 80° C. for 20 minutes when the cells had coalesced and the mucilage had thinned. After adding filter aid, the solution was filtered. The resultant filtrate was neutralized to pH 3.2 with sodium hydroxide and treated with 10 grams of Super-Cel (a diatomaceous earth filter aid) and with a solution containing 17 grams of Polar Yellow 5G in 300 ml. of water. After stirring for 15 minutes, the polymyxin A-Polar Yellow 5G salt was filtered through a Buechner funnel over a pad of Super-Cel. The amorphous and crystalline precipitate was dried in vacuo and suspended in 850 ml. of a mixture containing 85% acetone-15% methanol. To this was added 28 ml. of a solution of triethylamine sulfate (0.3 gram per ml.) in methanol. The suspension was shaken for one hour, filtered and washed with 85% acetone-15% methanol and finally with acetone. The insoluble polymyxin A sulfate, mixed with Super-Cel, was dried under diminished pressure at 50° until free of acetone. The mixture was suspended in water, filtered free of the Super-Cel and the resultant filtrate was vacuum freeze-dried. After drying, the dried polymyxin A sulfate had a potency of 3800 U./mg. by serial dilution bioassay and 3400 U./mg. by the agar cup plate assay and contained about 4% ash.

The microbiological assays for the determination of the antibacterial potencies were carried out by two procedures:

(1) *Serial dilution method.*—The working standard is made up to contain 25 U./ml. in distilled water. Samples are diluted to the same approximate potency. Both the standard and the samples are pipetted into a series of tubes which are then inoculated with a culture of *Escherichia coli* (CN 1470). The assay medium is made up of Difco Antibiotic Assay Broth. After incubation for 2½ hours, the end points are determined and the proper calculations are made;

(2) *Agar cup plate assay.*—The same strain of *E. coli* previously described is used as test organism. The culture medium for the plate assay is Trypticase Soy Phosphate Agar. The standard range is from 50 to 1000 U./ml. These assays are based on the report that pure polymyxin A has been designated 10,000 U./mg.

*Example 2*

To an aqueous solution containing 1500 U./ml. and made up of polymyxin A of ca. 100 U./mg. at pH 3.2 was added 25 grams of Super-Cel and a solution containing 18 grams of Polar Yellow 5G dissolved in 300 ml. of water. After filtering, the precipitate was washed with water and the polymyxin A-Polar Yellow salt was dried in vacuo. To the filtrate was added an additional 9 grams of Polar Yellow and, after filtering, the resultant filtrate showed less than 50 U./ml. After drying, the combined precipitates were suspended in 500 ml. of a mixture containing 85% acetone-15% methanol. This was followed by the calculated amount of pyridine phosphate in methanol. After mechanically shaking the mixture for one hour, the insoluble polymyxin phosphate was washed with a solution containing 85% acetone-15% methanol until a colorless precipitate was obtained. The cake was washed with anhydrous acetone and dried under diminished pressure. The polymyxin A phosphate, mixed with Super-Cel, was dissolved in water and filtered. The resultant filtrate was vacuum freeze-dried. The dried polymyxin A phosphate biologically compared against the working standard had an average activity of 4000 U./mg. by the serial dilution bioassay and 4400 U./mg. by the agar cup plate bioassay.

*Example 3*

Thirty liters of a freshly harvested fermentation broth containing 1000 U./ml. of polymyxin B (an elaboration product produced by cultivation of strains of *B. polymyxa* in a suitable culture medium which provides a polymyxin essentially free of nephrotoxic effect), was acidified to pH 1.6 with sulfuric acid and heated at 80° for 1 hour. The resultant mixture was readily filtered and the filtrate was neutralized to pH 4. It was then treated with 180 grams of Super-Cel and an aqueous solution containing 120 grams of the sodium salt of Polar Yellow. After stirring for 15 minutes, the insoluble polymyxin B-Polar Yellow salt was filtered on a Buechner funnel over a Super-Cel pad. The resultant filtrate was found to contain less than 50 U./ml. The polymyxin B dye salt, after drying in vacuo, was suspended in 3 liters of 85% acetone-15% methanol and treated with 300 ml. of triethylamine sulfate (0.3 gm./ml.). The polymyxin B sulfate and Super-Cel mixture was filtered and resuspended in another liter of the same acetone-methanol mixture and treated a second time with only 100 ml. of triethylamine sulfate. After filtering and washing with acetone, the combined polymyxin B sulfate cakes were dried under diminished pressure, dissolved in water and treated with a solution containing 80 grams of sodium Polar Yellow. After filtering and washing the resultant precipitate with water, it was dried in vacuo, resuspended in acetone-methanol and treated with 200 ml. of an alcoholic solution of triethylamine citrate. After removing the Super-Cel, by dissolving and filtering, the clear resultant solution of polymyxin B citrate was vacuum freeze-dried. The dried polymyxin B citrate had an average biological potency of 6200 U./mg. by the serial dilution method and 6600 U./mg. by the agar cup plate bioassay.

Example 4

A freshly harvested fermentation broth previously cultured by a strain which produces predominantly polymyxin B was acidified to pH 2 with sulfuric acid and heated at 95° for 1 hour. After adding filter-aid, the mixture was filtered and the filtrate was neutralized with sodium hydroxide to pH 6.5. This solution (7 liters—1000 U./ml.) was slowly poured through a column containing 30 grams of sodium cotton succinate, which removed all the polymyxin B from the broth. After washing the sodium cotton succinate with distilled water to remove all colored impurities and objectionable contaminants, the antibiotic was eluted from the cotton with 0.1 N sulfuric acid; yield 95%.

The resultant colorless solution was neutralized at 50° C. to pH 3.5 with barium hydroxide and the barium sulfate precipitate filtered. To the filtrate was added 7 grams of Super-Cel and this was followed with an aqueous solution containing 7.2 grams of the sodium salt of Polar Yellow 5G. The precipitated polymyxin B-Polar Yellow salt was filtered, washed with distilled water and dried in vacuo. It was then suspended in 350 ml. of a mixture containing 75% acetone-25% methanol, and, after shaking, 12 ml. of a solution of triethylamine sulfate (0.3 gram/ml.) in methanol was added. After shaking for 1 hour, the polymyxin B sulfate combined with the filter-aid was filtered, washed with the acetone-methanol mixture until all the excess dye was removed, and finally washed with acetone. After drying under diminished pressure, the mixture was dissolved in water and the Super-Cel removed by filtration. The resultant filtrate was vacuum freeze-dried. The dried polymyxin B sulfate had a biological potency of 6500 U./mg. by the serial dilution method, 7000 U./mg. by the agar cup plate bioassay and contained less than 1% ash.

Example 5

Six liters of freshly harvested fermentation broth containing 1000 U./ml. of polymyxin B was acidified to pH 2.0 with dilute sulfuric acid and heated at 90° for one hour. To the resultant mixture was added 20 g. of filter-aid. After filtering the filtrate was neutralized to pH 3.7 with dilute sodium hydroxide, and treated with 22 g. of Polar Yellow. After stirring for 15 minutes, the insoluble polymyxin B Polar Yellow salt was filtered on a Buechner funnel over a Super-Cel pad. The resultant filtrate was found to contain less than 50 U./ml. The polymyxin B dye salt after drying in vacuo, was suspended in 500 mls. of 85% acetone-15% methanol and treated with 50 mls. of triethylamine sulfate (0.3 gm./ml.). The polymyxin B sulfate and Super-Cel mixture was filtered and resuspended in 200 mls. of the same acetone-methanol mixture and treated a second time with 10 ml. of triethylamine sulfate. After filtering and washing with acetone, the combined polymyxin B sulfate cakes were dried under diminished pressure, dissolved in water and cooled to 0°. The solution was adjusted so that it contained 100,000 U./ml. of polymyxin and treated with a cooled solution of 1 N sodium hydroxide to pH 12 when practically all the polymyxin (over 90%) was precipitated. The precipitate was collected, washed thoroughly with water, resuspended in water and acidified to pH 5 with dilute sulfuric acid. The clear resultant solution was vacuum freeze-dried; the dried polymyxin B sulfate had an average biological potency of 7000 U./mg. by the serial dilution method and 7200 U./mg. by the agar cup plate bioassay.

Example 6

To 6800 ml. of a crude streptomycin solution was added 50 grams of Super-Cel and a 5% solution of Polar Yellow 5G in increments until no further precipitate was formed. Less than 5% of the streptomycin was found in the filtrate after removal of the streptomycin-Polar Yellow salt. The latter was dried in vacuo, ground in a mortar and suspended in 500 ml. of dry methanol to which was added 10 ml. (0.45 gm./ml.) of triethylamine sulfate in methanol. The entire mixture was shaken for 30 minutes, the streptomycin was removed by filtration, washed with dry methanol and dried in vacuo. The resultant dried streptomycin sulfate and Super-Cel was dissolved in water, filtered to eliminate the Super-Cel and the resultant filtrate vacuum freeze dried. Bioassays by the agar plate method, using *B. subtilis*, and by the turbidimetric method, using *E. coli*, showed that the streptomycin sulfate had a potency of 670 $\gamma$/mg.

Example 7

Six liters of a bacitracin fermentation broth (25 U./ml.) was adjusted to pH 2.1 with dilute sulfuric acid. After treating with 100 g. of Super-Cel, the broth was filtered over a Super-Cel precoated Buechner funnel. The filtrate was treated with 15 g. of Super-Cel and 15 g. of the monosodium of Polar Yellow; it was stirred for one-half hour, filtered, and the filtrate, containing about 3 U./ml. was discarded. The bacitracin-Polar Yellow 5G salt was suspended and stirred in 200 ml. of water and treated with a sufficient amount of a 2% solution of ammonium hydroxide, until pH 8.8 was permanently maintained and a practically clear solution was obtained. Although the broth can be treated with the dye at any pH within 2 to 9, for best results we prefer to carry out the precipitation at pH 2. The mixture was filtered from the Super-Cel and the bacitracin salt of Polar Yellow 5G in the filtrate was extracted with four 150 ml. portions of water-saturated butyl alcohol. The spent aqueous phase was discarded, the butyl alcohol fractions were combined and an equal volume of dichloroisopropyl ether was added for the purpose of depressing the solubility of the bacitracin in the organic phase. The butyl alcohol can be diluted with a series of other solvents, the only conditions being that on subsequent liberation of the bacitracin from the bacitracin-Polar Yellow 5G salt in the butyl alcohol phase, the solvent will not diminish the solubility of the free dye. In this case, chlorobenzene or isopropyl ether can be used.

However, in this experiment the butyl alcohol-dichloroisopropyl ether solution was then treated with two 50 ml. portions of 1 N sulfuric acid, and washed once with 50 ml. of water. The acid and aqueous layers were combined, neutralized with barium hydroxide and the barium sulfate filtered. The colorless filtrate was frozen, dried under high vacuum and further dried in a vacuum desiccator over barium oxide; the dried bacitracin, free of ash, when assayed against the Meleney working standard gave an average potency of 30 U./mg. by the *S. aureus* agar plate and turbidimetric assays, and showed a satisfactory mouse toxicity test.

The microbiological assays for the determination of the antibacterial potencies of the bacitracin, herein referred to, were carried out by two procedures: (1) By a method similar to the Schmidt and Moyer method (J. Bact., vol. 47, p. 199, (1944)) for penicillin; however, the organism which was used was a *Staphylococcus aureus* (A. T. C. #157); (2) By a turbidimetric method essentially the same as the method of McMahan (J. Biol. Chem., vol. 153, p. 249 (1944)) except that *S. aureus* (A. T. C. #157) was used as the test organism. The bacitracin samples were compared against a standard.

*Example 8*

Two liters of a bacitracin fermentation broth (18 U./ml.) was adjusted to pH 2 with dilute hydrochloric acid. After treating with 25 g. of Super-Cel, the broth was filtered through a Buechner funnel precoated with filter-aid. The filtrate was treated with 5.2 g. of Super-Cel and 5.2 g. of the monosodium salt of Polar Yellow; it was stirred for one-half hour, filtered and the filtrate, containing 3.8 U./ml., was discarded. The salt was suspended in 100 ml. of water and treated with a dilute solution of ammonium hydroxide until the salt was completely dissolved (pH 8.9). The mixture was separated from the Super-Cel and the bacitracin salt was extracted from this solution with 2 portions (30 ml.) of water-saturated phenyl "cellosolve." The spent aqueous phase was discarded, the phenyl "cellosolve" fractions were combined and treated with 1 N hydrochloric acid and several volumes of dichloroisopropyl ether for the purpose of depressing the solubility of the bacitracin in the organic phase. The hydrochloric acid layer was rapidly drawn off and neutralized with small portions of silver oxide and filtered. The colorless filtrate was frozen, dried under high vacuum and further dried in a vacuum desiccator over barium oxide; the dried bacitracin, free of ash, when assayed against the Meleney working standard gave an average potency of 25 U./mg. by the *S. aureus* agar plate and turbidimetric assays, and showed a satisfactory mouse toxicity test.

The invention claimed is:

1. In the recovery of polymyxin salts of high antibiotic activity from clarified polymyxin fermentation broths, the step of adding Polar Yellow 5G to such a broth, thereby forming an insoluble polymyxin salt of said dye.

2. Method of recovering therapeutically useful polymyxin salts from a polymyxin fermentation broth, which comprises acidifying said broth and heating same until the cells coalesce and the mucilage thins out, filtering said broth and adjusting the filtrate to a pH of 2 to 9, and then reacting said filtrate with Polar Yellow 5G to form an insoluble polymyxin salt of said dye.

3. Method of recovering therapeutically useful polymyxin salts from a polymyxin fermentation broth, which comprises acidifying said broth and heating same until the cells coalesce and the mucilage thins out, filtering said broth and adjusting the filtrate to a pH of 2 to 9, then reacting said filtrate with Polar Yellow 5G to precipitate polymyxin-Polar Yellow 5G, suspending said polymyxin-Polar Yellow 5G in an organic solvent selected from the group consisting of alcohol, acetone and mixtures of alcohol and acetone, and then reacting with an amine sulfate selected from the group consisting of the sulfates of dimethylaniline, diethylaniline, ethylamine, triethylamine, quinoline, pyridine and ethanolamine, to precipitate an insoluble salt of polymyxin and leave the resulting amine salt of Polar Yellow 5G in solution..

4. Method of recovering therapeutically useful polymyxin salts of high antibiotic activity from a clarified polymyxin fermentation broth, which comprises reacting said broth with Polar Yellow 5G to precipitate a polymyxin Polar Yellow 5G salt, suspending said dye salt in an organic solvent selected from the group consisting of alcohol, acetone and mixtures of alcohol and acetone, and then reacting said dye salt with an amine salt selected from the group consisting of the sulfates, phosphates, oxalates and citrates of an amine selected from a group consisting of dimethylaniline, diethylaniline, ethylamine, triethylamine, quinoline, pyridine and ethanolamine, to precipitate an insoluble salt of polymyxin and leave the resulting amine salt of Polar Yellow 5G in solution.

5. In a method for recovering polymyxin from a polymyxin Polar Yellow 5G salt, the steps of suspending said dye salt in an organic solvent selected from the group consisting of alcohol, acetone, and mixtures of alcohol and acetone, and then reacting said dye salt with an amine salt selected from the group consisting of the sulfates, phosphates, oxalates, and citrates of an amine selected from the group consisting of dimethylaniline, diethylaniline, ethylamine, triethylamine, quinoline, pyridine and ethanolamine, to precipitate an insoluble salt of polymyxin and leave the resulting amine salt of Polar Yellow 5G in solution.

6. In a method for recovering polymyxin from a polymyxin Polar Yellow 5G salt, the steps of suspending said dye salt in an organic solvent selected from the group consisting of alcohol, acetone, and mixtures of alcohol and acetone, and then reacting said dye salt with an amine sulfate selected from the group consisting of the sulfates of dimethylaniline, diethylaniline, ethylamine, triethylamine, quinoline, pyridine and ethanolamine, to precipitate polymyxin sulfate and leave the resulting amine salt of Polar Yellow 5G in solution.

PETER P. REGNA.
ISAIAH A. SOLOMONS, III.

REFERENCES CITED

The following references are of record in the file of this patent:

UNITED STATES PATENTS

| Number | Name | Date |
| --- | --- | --- |
| 2,022,678 | Kritchevsky et al. | Dec. 3, 1935 |
| 2,462,175 | Folkers | Feb. 22, 1949 |

OTHER REFERENCES

Goorley—"Some Chemical and Physical Properties of Bacitracin."

Color Index, 1st Edition (1924), pp. 35 and 165.

Kuehl et al: Science, vol. 102, pp. 34 and 35 (1945).

Keuhl et al: J. Am. Chem. Soc., vol. 68, pp. 1460–1462 (1946).

Ainsworth in Nature, vol. 160, August 23, 1947, page 263.

Stansly in Nature, vol. 163, April 16, 1949, page 611.